(12) United States Patent
Jiang et al.

(10) Patent No.: US 8,140,471 B2
(45) Date of Patent: Mar. 20, 2012

(54) FRAMEWORK FOR METADATA-DRIVEN DYNAMIC REPORTING SYSTEMS AND METHODS

(75) Inventors: Yuan Jiang, Foster City, CA (US); Paul Wieneke, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 553 days.

(21) Appl. No.: 11/748,613

(22) Filed: May 15, 2007

(65) Prior Publication Data

US 2008/0288451 A1 Nov. 20, 2008

(51) Int. Cl.
*G06F 7/06* (2006.01)
*G06F 17/30* (2006.01)

(52) U.S. Cl. .................. 707/603; 707/804; 707/769

(58) Field of Classification Search .......... 707/3, 102, 707/4, 104.1, 999.003, 999.004, 999.102, 707/999.104, 603, 103, 999.103, 999.107, 707/722, 769, 803, 804

See application file for complete search history.

(56) References Cited

U.S. PATENT DOCUMENTS 7,143,107 B1 * 11/2006 Nebres, Jr. ............... 707/103 R
2007/0179975 A1 * 8/2007 Teh et al. .................. 707/104.1

* cited by examiner

*Primary Examiner* — James Trujillo
*Assistant Examiner* — Bruce Moser
(74) *Attorney, Agent, or Firm* — Kilpatrick Townsend & Stockton LLP

(57) ABSTRACT

Embodiments of the invention provide systems and methods for dynamically reporting information stored in a repository. According to one embodiment, a method for dynamically reporting information stored in one or more data repositories can comprise retrieving report metadata from a report repository. The report metadata can define a format for the report and identify one or more queries for the report. Query metadata can be retrieved from a query repository. The query metadata can define one or more queries, for example, Structured Query Language (SQL) queries. Retrieving the query metadata can be based on the one or more queries identified in the report metadata. The one or more queries defined by the query metadata can be performed on the one or more data repositories and a results matrix can be populated with results of performing the one or more queries defined in the query metadata.

18 Claims, 13 Drawing Sheets

FRAMEWORK FOR METADATA-DRIVEN DYNAMIC REPORTING SYSTEMS AND METHODS

BACKGROUND OF THE INVENTION

Embodiments of the present invention relate generally to reporting information stored in a repository and more particularly to dynamically reporting information stored in a repository based on a set of metadata.

Data stored in one or more data repositories is frequently requested for viewing or other use. For example, one or more queries, such as Structured Query language (SQL) queries can be run on the data in the repositories and a report can be generated to display or print the results. In some cases, these processes can be initiated and/or displayed through a web-based application. That is, a user can be presented with a webpage through which a report can be requested and results can be viewed.

The traditional approach to reporting information in a repository is to create a graphic user interface such as a web page for each report and to switch among those user interfaces on the user's demand. That is, the user is presented with a series of static, pre-defined queries and reports from which to choose. If the user wants a different set of queries or a different report, a new page for that report needs to be coded before it can be used.

However, this traditional approach has several problems. For example, this approach does not scale well, it is hard to maintain, it is expensive resource-wise, and it can be slow to switch reports at runtime. These difficulties are especially true with web applications. Dynamic reporting software, i.e., reporting software that can dynamically vary the queries to be executed and the format of reports to be generated based on the needs or preferences of the user, has been difficult to build. Hence, there is a need for methods and systems that provide for dynamically reporting information stored in a repository.

BRIEF SUMMARY OF THE INVENTION

Embodiments of the invention provide systems and methods for dynamically reporting information stored in a repository. According to one embodiment, a method for dynamically reporting information stored in one or more data repositories can comprise retrieving report metadata from a report repository. The report metadata can define a format for the report and identify one or more queries for the report. Query metadata can be retrieved from a query repository. The query metadata can define one or more queries, for example, Structured Query Language (SQL) queries. Retrieving the query metadata can be based on the one or more queries identified in the report metadata. The one or more queries defined by the query metadata can be performed on the one or more data repositories and a results matrix can be populated with results of performing the one or more queries defined in the query metadata.

For example, prior to retrieving the report metadata, a name of a report requested can be received. In such a case, retrieving the report metadata can comprise retrieving the report metadata from a plurality of report metadata based on the name of the report requested. The report metadata can include a query name and retrieving the query metadata from the query repository can be based on the query name.

According to one embodiment, the report metadata can comprise a column sequence definition for one or more of the queries. In such cases, populating the results matrix with the results of performing the one or more queries can be based on the column sequence definition. Additionally or alternatively, the method can include populating a table with column names defined by the report metadata and populating columns of the table with the results of performing the one or more queries from the results matrix. A determination can be made as to whether the results of performing the one or more queries comprises less than a predetermined size of the table. In response to determining the results of performing the one or more queries comprise less than the predetermined size of the table, unused columns of the table can be hidden. The method can further comprise outputting the table.

According to another embodiment, a system can comprise a source data repository and a report repository. The report repository can have stored therein report metadata. The report metadata can define a format for one or more reports and identify one or more queries for each of the one or more reports. The system can also include a query repository having stored therein query metadata. The query metadata can define one or more queries such as Structured Query Language (SQL) queries. A dynamic data provider module can be communicatively coupled with the source data repository, the report repository, and the query repository. The dynamic data provider can be adapted to retrieve report metadata for a requested report from the report repository and retrieve query metadata from the query repository. Retrieving the query metadata can be based on the one or more queries identified in the report metadata. The dynamic data provider can perform the one or more queries defined by the query metadata on the source data repository, and populate a results matrix with results of performing the one or more queries defined in the query metadata.

According to one embodiment, the report metadata can comprise a column sequence definition. In such cases the dynamic data provider can populate and sort the columns in the results matrix with the results of performing the one or more queries based on the column sequence definition order.

The system can also include a dynamic report renderor. In such cases, the dynamic data provider can be further adapted to provide the results matrix and column names defined by the report metadata to the dynamic data renderor. The dynamic report renderor can be adapted to receive the results matrix and the column names defined by the report metadata from the dynamic data provider, populate a table with the column names defined by the report metadata, and populate columns of the table with the results of performing the one or more queries from the results matrix. In some cases, the dynamic report renderor can be further adapted to determine whether the results of performing the one or more queries comprise less than a predetermined size of the table. The dynamic report renderor can hide unused columns of the table in response to determining the results of performing the one or more queries comprises less than the predetermined size of the table. The dynamic report renderor can be further adapted to output the table.

The system may also include a report designer tool communicatively coupled with the report repository. The report designer tool can be adapted to provide a user interface and utilities for generating and maintaining report metadata stored in the report repository. The system can additionally or alternatively include a query repository builder tool communicatively coupled with the query repository. The query repository builder tool can be adapted to provide a user interface and utilities for generating and maintaining query metadata stored in the query repository.

According to yet another embodiment, a machine-readable medium can have stored thereon a series of instructions which, when executed by a processor, cause the processor to report information stored in one or more data repositories by retrieving report metadata from a report repository. The report metadata can define a format for the report and identify one or more queries for the report. Query metadata can be retrieved from a query repository. The query metadata can define one or more queries. Retrieving the query metadata can be based on the one or more queries identified in the report metadata. The one or more queries defined by the query metadata can be on the one or more data repositories and a results matrix can be populated with results of performing the one or more queries defined in the query metadata.

The report metadata can comprise a column sequence definition. In such cases, populating the results matrix with the results of performing the one or more queries can be based on the column sequence definition. That is, the column sequences decide the order of their associated queries in the results matrix. A table can be populated with column names defined by the report metadata. Columns of the table can be populated with the results of performing the one or more queries from the results matrix and the table can be output.

BRIEF DESCRIPTION OF THE DRAWINGS

FIGS. 5A-5D are screenshots illustrating an exemplary interface for a report designer according to one embodiment of the present invention.

DETAILED DESCRIPTION OF THE INVENTION

Figure 1:
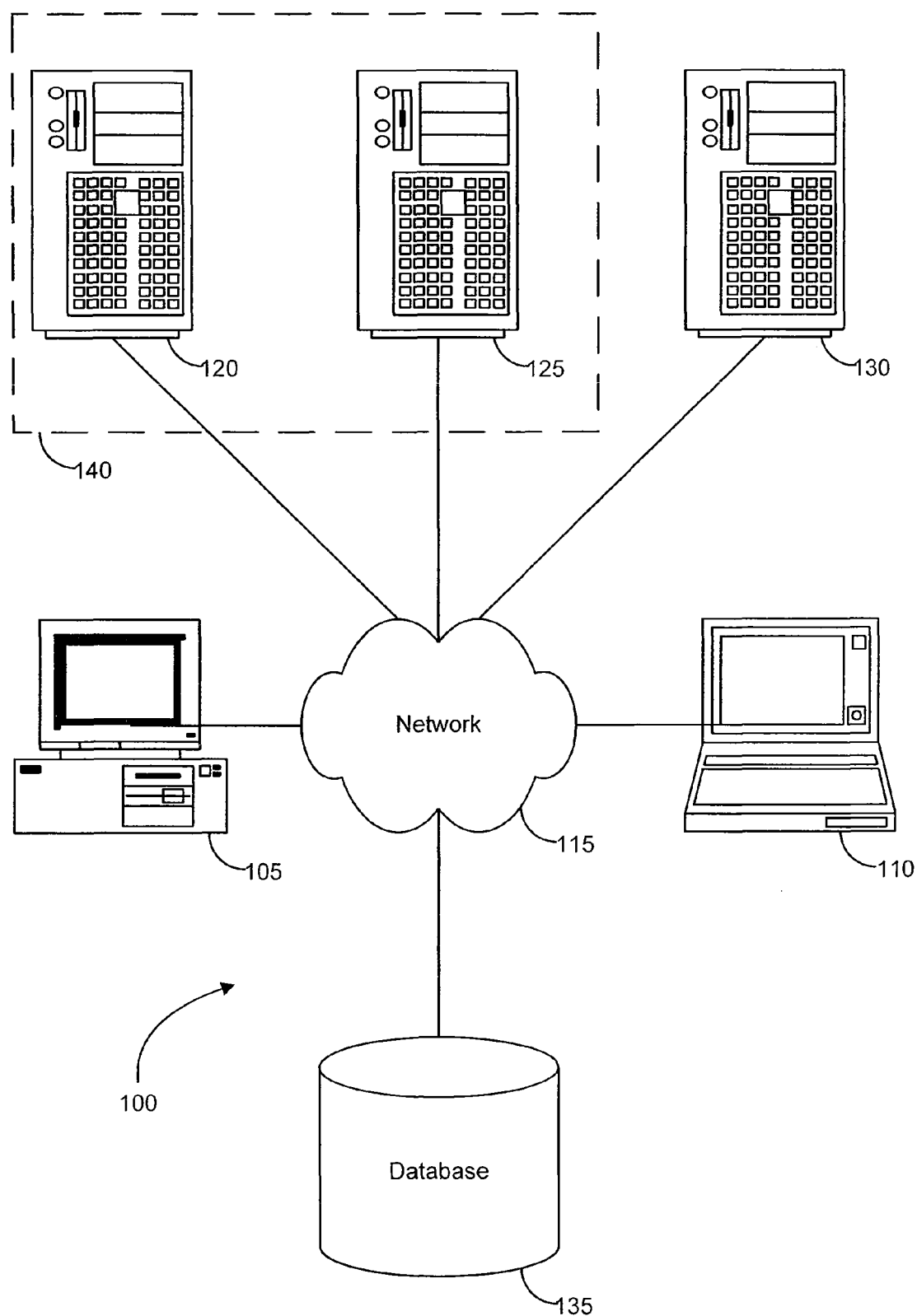
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for dynamically reporting information stored in a repository. That is, embodiments of the present invention provide for dynamically reporting information from one or more data repositories based on selections made by the user regarding the report format and/or queries used. For example, dynamically reporting information stored in one or more data repositories can comprise retrieving report metadata from a report repository. The report metadata can define a format for the report and identify one or more queries for the report. Query metadata can be retrieved from a query repository. The query metadata can define one or more queries, for example, Structured Query Language (SQL) queries. Retrieving the query metadata can be based on the one or more queries identified in the report metadata. The one or more queries defined by the query metadata can be performed on the one or more data repositories and a results matrix can be populated with results of performing the one or more queries defined in the query metadata. The results matrix and column names defined in the report metadata can be used to populate a table that can in turn be output in the form of the report.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
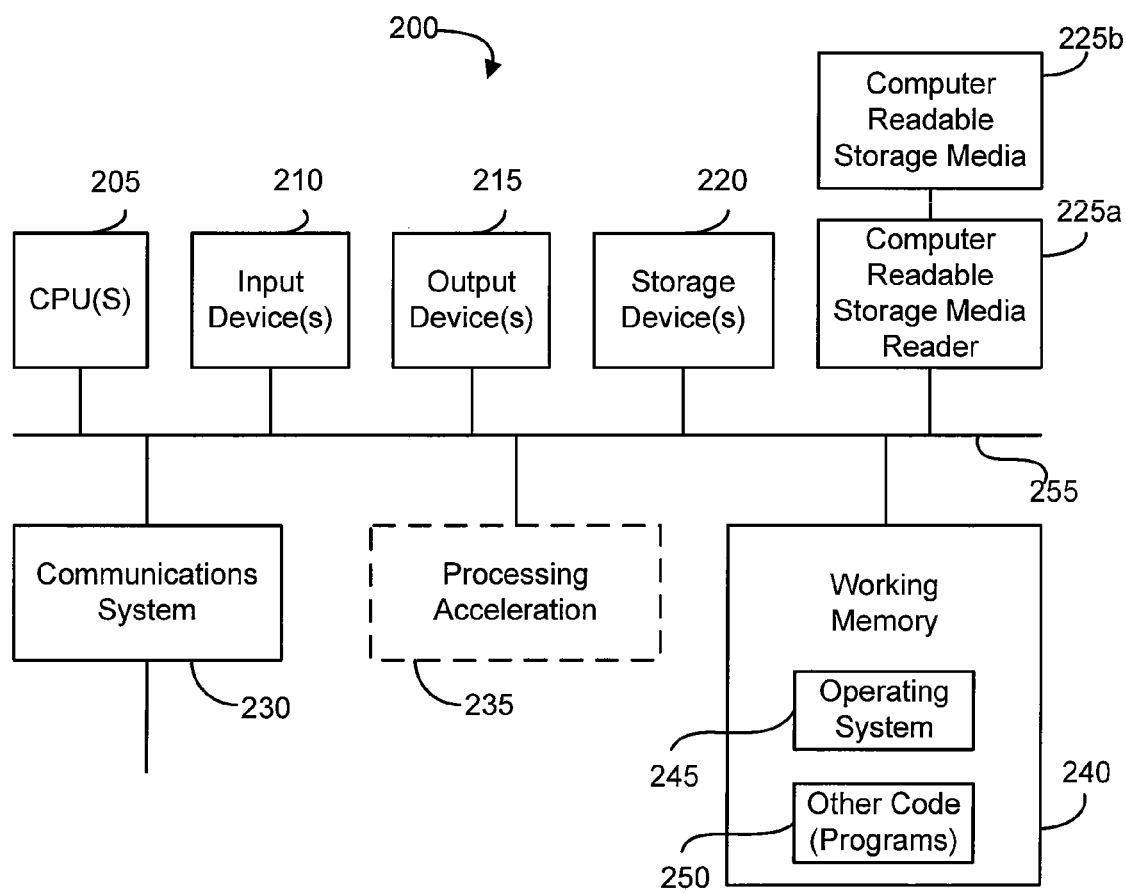
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
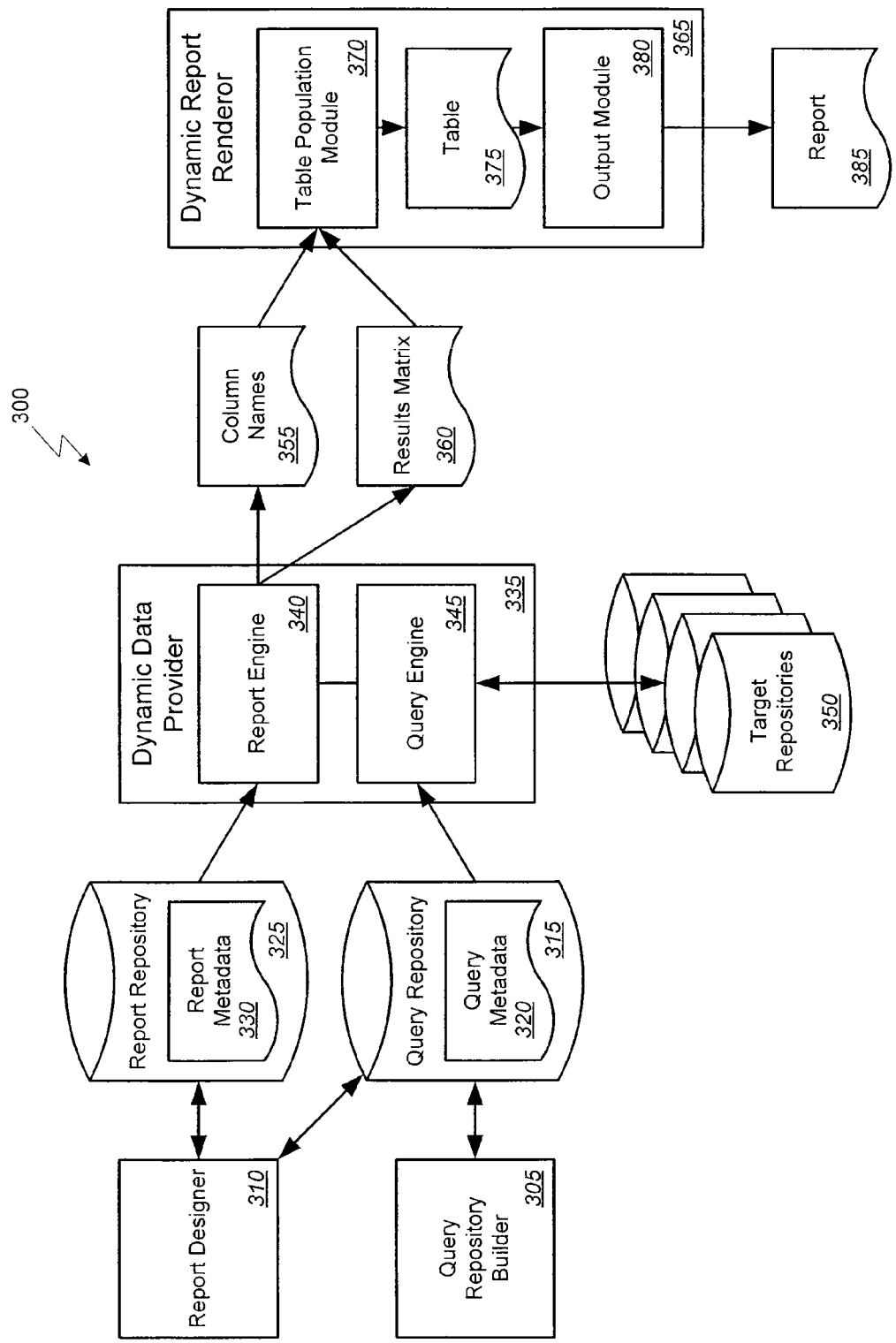
FIG. 3 is a block diagram illustrating, at a high level, a system for dynamically reporting information stored in a repository according to one embodiment of the present invention.

FIG. 3 is a block diagram illustrating, at a high level, a system for dynamically reporting information stored in a repository according to one embodiment of the present invention. In this example, the system 300 includes a set of one or more target data repositories 350. The target data repositories 350 can comprise any of a number of different repositories types as described above and, as will be seen, can maintain the data which will be the subject of queries to be performed and reports to be generated by the system 300. Also, it should be understood that, while illustrated here as a component separate from other elements of the system 300, the target repositories 350 may be implemented as part of or separate from other elements of the system 300 and may be communicatively coupled with the other elements by one or more networks (not shown here) such as the Internet or another network as described above.

The system 300 can also include a report repository 325. The report repository 325 can have stored therein report metadata 330 such as, by way of example and not limitation, eXtensible Markup Language (XML) metadata. The report metadata 330 can define a format for one or more reports that can be generated by the system 300 and can identify one or more queries for each of the one or more reports. For example, the report metadata 330 can include metadata defining a report name identifying the report, a report description (e.g., a user defined description), and one or more query names identifying queries to be performed on the target repositories to generate the report. Other examples of report metadata include but are not limited to a column description, a column type, and a column sequence defining columns of the report output (i.e., the report format) and possibly upper and/or lower threshold values for the data of one or more columns (i.e., upper and lower values for highlighting and/or coloring the query result values output in the report). It should be understood that additional, fewer, or different metadata may be defined based on the exact implementation without departing from the scope of the present invention.

The system 300 may also include a report designer tool 310 communicatively coupled with the report repository 325, for example via the Internet or other network (not shown here) as described above. Generally speaking, the report designer tool 310 can be adapted to provide a user interface, such as a web page, and utilities for generating and maintaining report metadata 330 stored in the report repository 325. Screenshots of an exemplary user interface that can be provided by the report designer tool 310 will be described below with reference to FIGS. 5A-5D.

The system 300 can also include a query repository 315 having stored therein query metadata 320 such as, by way of example and not limitation, extensible Markup Language (XML) metadata. For example, the query metadata can include a query name identifying the query as well as a query definition. For example, the query metadata can define one or more queries such as Structured Query Language (SQL) or other language queries. It should be understood that additional, fewer, or different metadata may be defined based on the exact implementation without departing from the scope of the present invention.

The system 300 can additionally or alternatively include a query repository builder tool 305 communicatively coupled with the query repository 315, for example via the Internet or other network (not shown here) as described above. Generally speaking, the query repository builder tool 305 can be adapted to provide a user interface and utilities for generating and maintaining query metadata 320 stored in the query repository 315. Screenshots of an exemplary user interface that can be provided by the query repository builder tool 305 will be described below with reference to FIGS. 4A-4C.

A dynamic data provider module 335 can be communicatively coupled with the target repositories 350, the report repository 325, and the query repository 315, for example via the Internet or other network (not shown here) as described above. The dynamic data provider 335 can include, for example, a report engine 340 and a query engine 345. Additional, fewer, or different components may be included depending upon the exact implementation without departing from the scope of the present invention.

The dynamic data provider 335 can be adapted to retrieve report metadata 330 for a requested report from the report repository 325 and retrieve query metadata 320 from the query repository 315. Retrieving the query metadata 320 can be based on the one or more queries identified in the report metadata 330, e.g., based on query names in the report metadata 330 identifying queries associated with or defined for that report. The dynamic data provider 335 can, for example via the query engine 345, perform the one or more queries defined by the query metadata 320 on the target repositories 350.

Upon completion of the query or queries, the dynamic data provider 335 can, for example via the report engine 340, populate a results matrix 360 with results of performing the one or more queries defined in the query metadata 320. According to one embodiment and as noted above, the report metadata 330 can comprise a column sequence definition. In such cases, the dynamic data provider 335 can populate the results matrix 360 with the results of performing the one or more queries based on the column sequence definition. That is, the column sequences can indicate the order of the query results in the results matrix. That is, a query with a smaller column sequence can appear in front of a query with a larger column sequence in the results matrix. Therefore, a user can re-arrange the columns in a report by adjusting the column sequences without changing other metadata.

The system 300 can also include a dynamic report renderor 365 communicatively coupled with the dynamic data provider 335, for example via the Internet or other network (not shown here) as described above. The dynamic data provider 335 can be further adapted to provide the results matrix 360 and column names 355 and possibly other data defined by the report metadata 330 to the dynamic data renderor 365.

The dynamic report renderor 365 can be adapted to receive the results matrix 360, the column names 355, and other data, if any, defined by the report metadata from the dynamic data provider 335. The dynamic report renderor 365, for example via a table population module 370, can be adapted to populate a table 375 with the column names and possibly other data defined by the report metadata. The dynamic report renderor 365 can also be adapted to populate columns of the table 375 with the results of performing the one or more queries from the results matrix 360. That is, based on the layout of the results matrix 360, the column names 355, and possible other data from the report metadata 330, the table population module 370 and/or the dynamic renderor 365 can map such data to and populate the table 375.

According to one embodiment, the table 375 may have a predefined size or dimensions. It should be understood that this size, while predefined, may be large to accommodate results of the queries and thus may depend on the size of and types of data in the target repositories, the types of queries and/or reports excepted, and other considerations. Regardless of the exact size of the table 375, the dynamic report renderor 365 can be further adapted to determine whether the results of performing the one or more queries, i.e., the results matrix 360 comprises less than the predetermined size of the table 370. That is, the dynamic report renderor 365 can determine if the results from the results matrix 360 occupy less than all of the table 375. In response to determining the results of performing the one or more queries comprises less than the predetermined size of the table 375, the dynamic report renderor 365 can hide unused columns of the table 375. That is, the unused columns of the table 375 can be masked from or disregarded in further processing by the dynamic report renderor 365.

The dynamic report renderor 365, for example via output module 380, can be further adapted to output the table 375, i.e., to output a report 385. According to one embodiment, the report 385 may be output or displayed as a web page. Screenshots of exemplary reports 385 be described below with reference to FIGS. 6A-6C.

It should be understood that, while described and illustrated here in terms of a separate dynamic data provider 335 and dynamic report renderor 365, such distinction is provided for illustrative purposes only and does not imply any required physical separation of components or functions. Rather, embodiments of the present invention may be implemented with additional, fewer, or different elements or components without departing from the scope of the present invention.

Figure 4A:
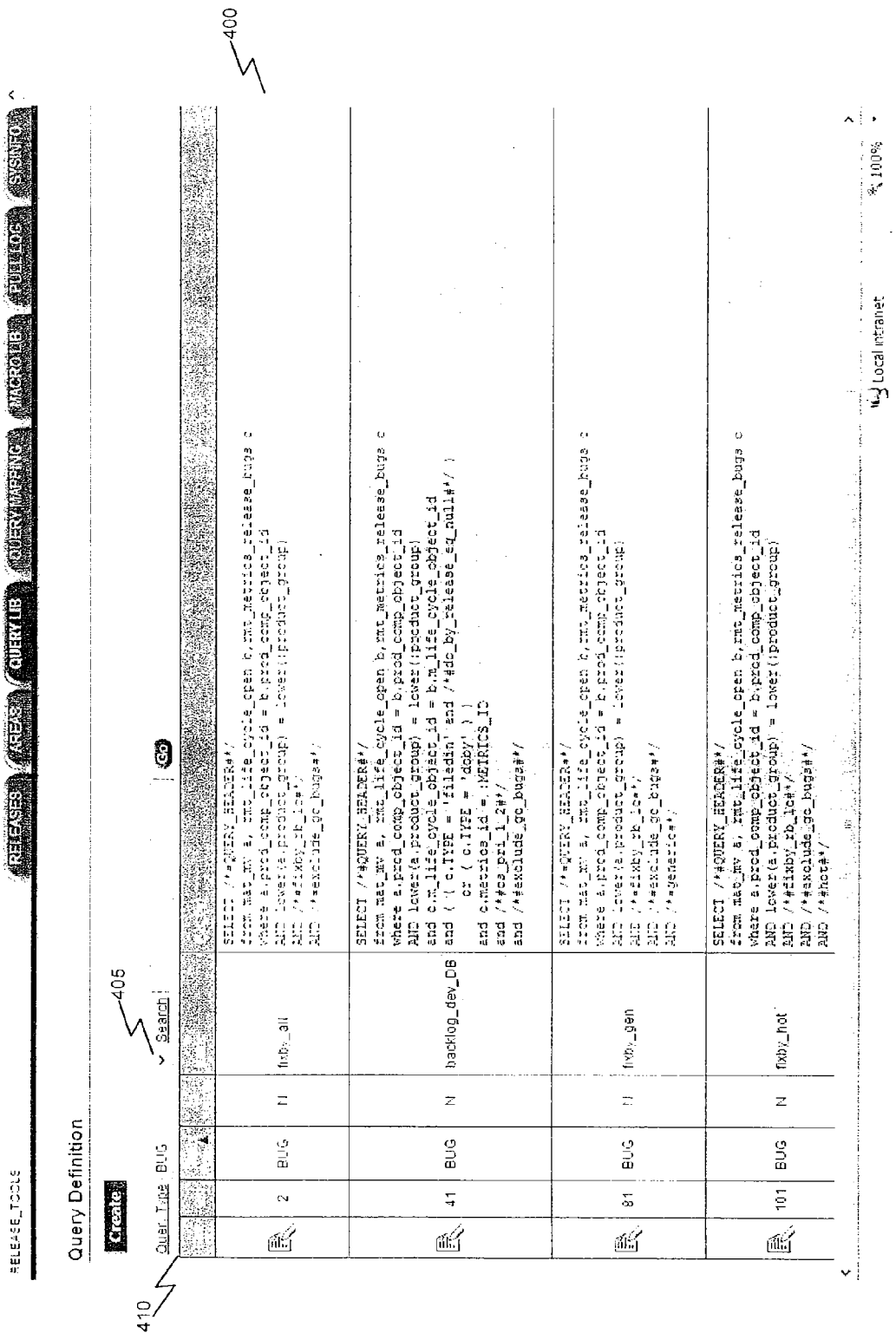
FIGS. 4A-4C are screenshots illustrating an exemplary interface for a query repository builder according to one embodiment of the present invention.
Figure 4B:
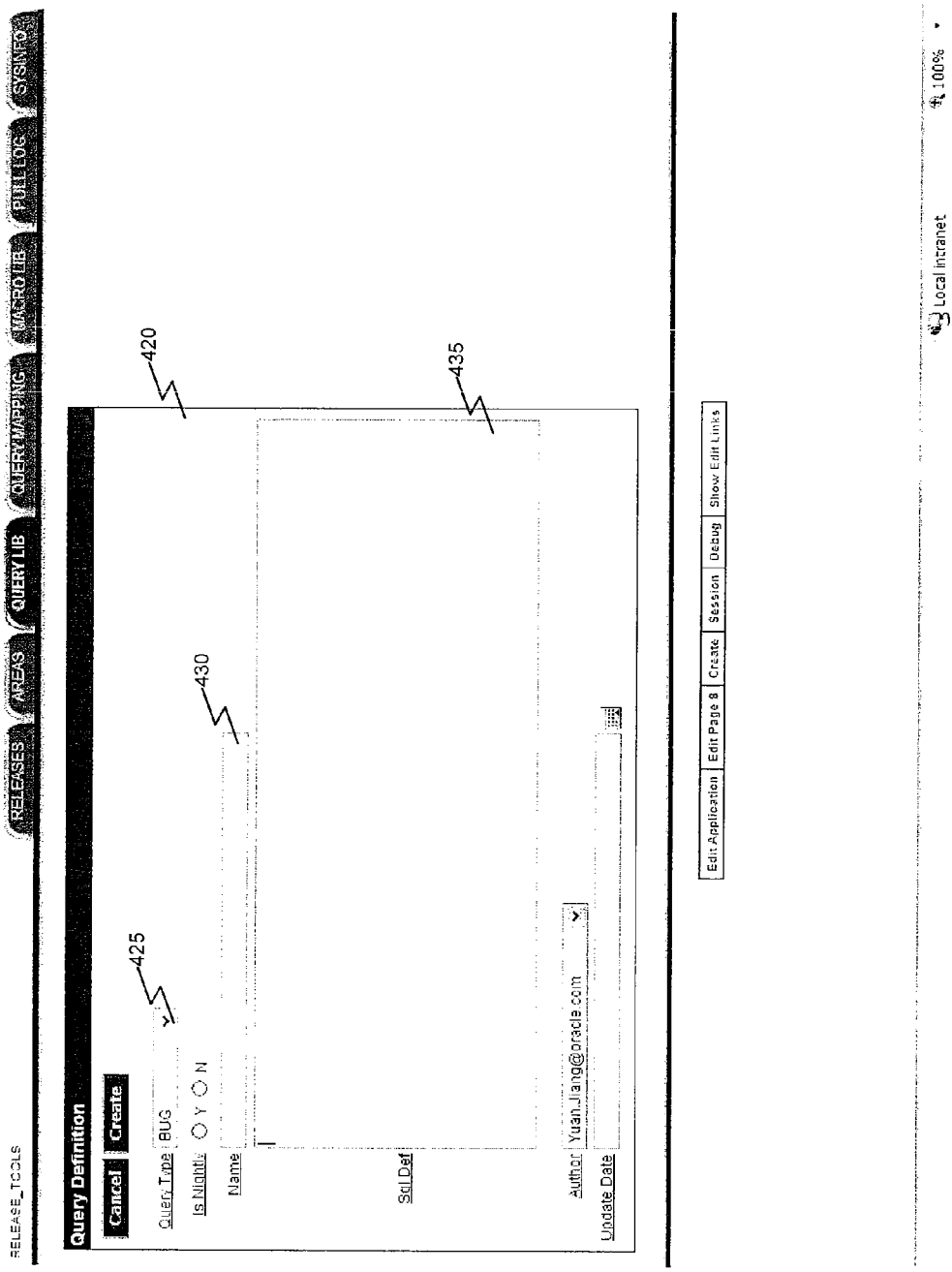
Figure 4C:
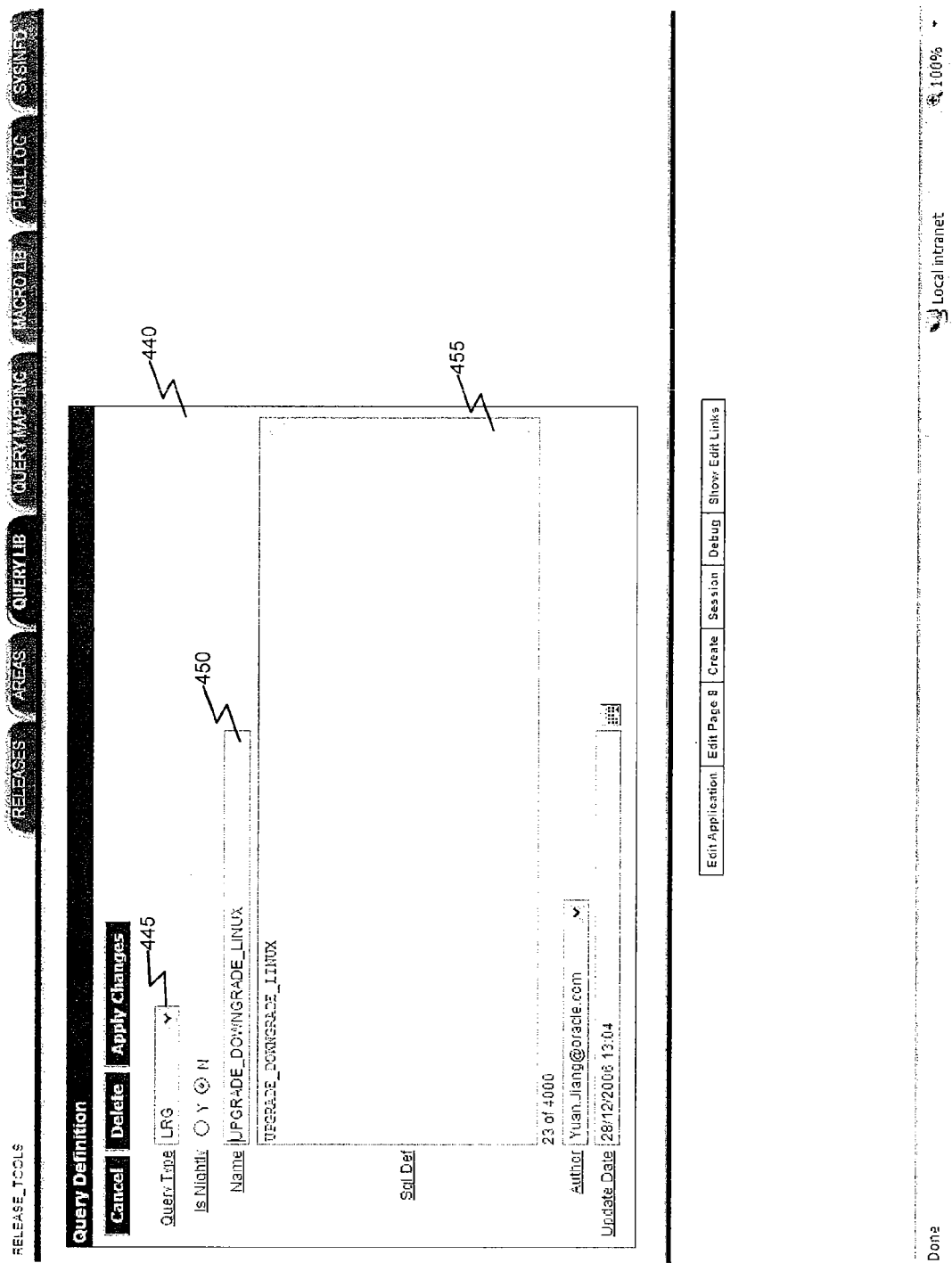

FIGS. 4A-4C are screenshots illustrating an exemplary interface for a query repository builder according to one embodiment of the present invention. It should be noted that these and other exemplary interfaces illustrated and described herein are provided for illustrative purposes only. It should be understood that, in other implementations the format, content, and other characteristics of the interfaces can vary significantly without departing from the scope of the present invention.

FIG. 4A is a screenshot illustrating a page on which is displayed an exemplary list 400 of previously defined queries available in the query repository. This list 400 can be sorted or presented based on a query type 405. The exemplary list 400 includes a name column 410 identifying the queries by name, i.e., the query name from the query metadata, and a SQL Def column 415 displaying the SQL language definition of the query from the query metadata. In use, a user can may choose to use one of these queries as is in a report, may choose to edit one of these queries for use in a report, or may create a new query.

FIG. 4B is a screenshot illustrating an exemplary interface for creating a new query. This example illustrates a dialog box 420 that includes various elements such as textboxes, radio buttons, combo boxes, etc for defining various information related to the query. For example, the dialog box 420 in this example includes a query type box 425 for selecting or defining a query type, a name text box 430 in which the user can provide a name for the query, and a SQL def text box 435 in which the user can define an SQL definition of the query.

FIG. 4C is a screenshot illustrating an exemplary interface for editing a query selected, for example via the list 400 presented in FIG. 4A. This example illustrates a dialog box 440 that includes various elements such as textboxes, radio buttons, combo boxes, etc for defining various information related to the query. For example, the dialog box 440 in this example includes a query type box 445 for selecting or defining a query type, a name text box 450 in which the user can provide a name for the query, and a SQL def text box 455 in which is presented the SQL definition of the query from the query metadata for editing by the user.

Figure 5A:
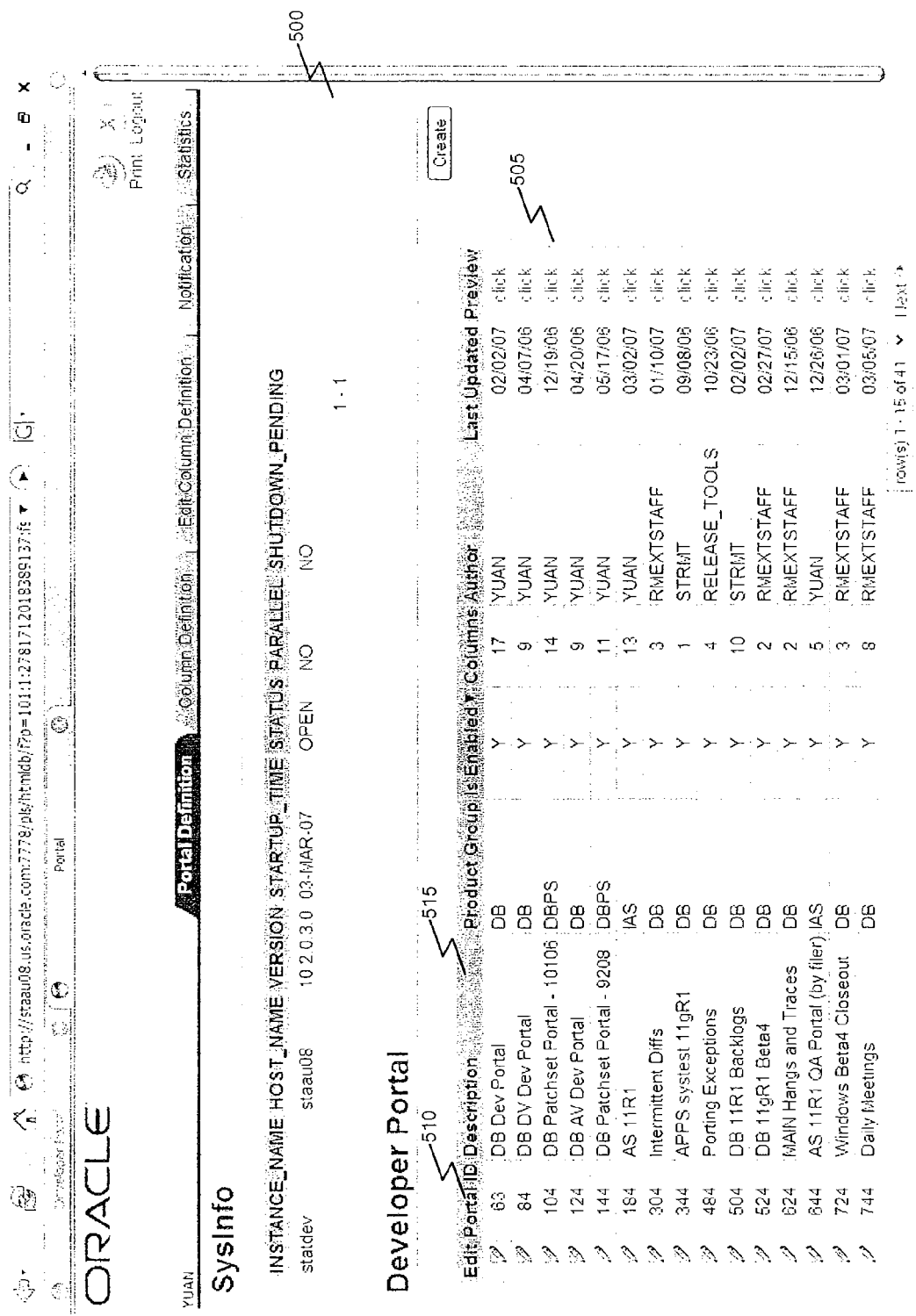

FIGS. 5A-5D are screenshots illustrating an exemplary interface for a report designer according to one embodiment of the present invention. More specifically, FIG. 5A is a screenshot illustrating a page 500 on which is displayed an exemplary list 505 of previously defined reports available in the report repository. The exemplary list 505 includes an ID column 510 providing the report identifier. In other cases a name identifying the report may be used. The list 505 can also include a description column 515 in which can be displayed the report description from the report metadata. Of course other or different information from the report metadata and/or elsewhere may also be displayed. In use, a user can may choose to use one of these reports as is, may choose to edit one of these reports, or may create a new report.

Figure 5B:
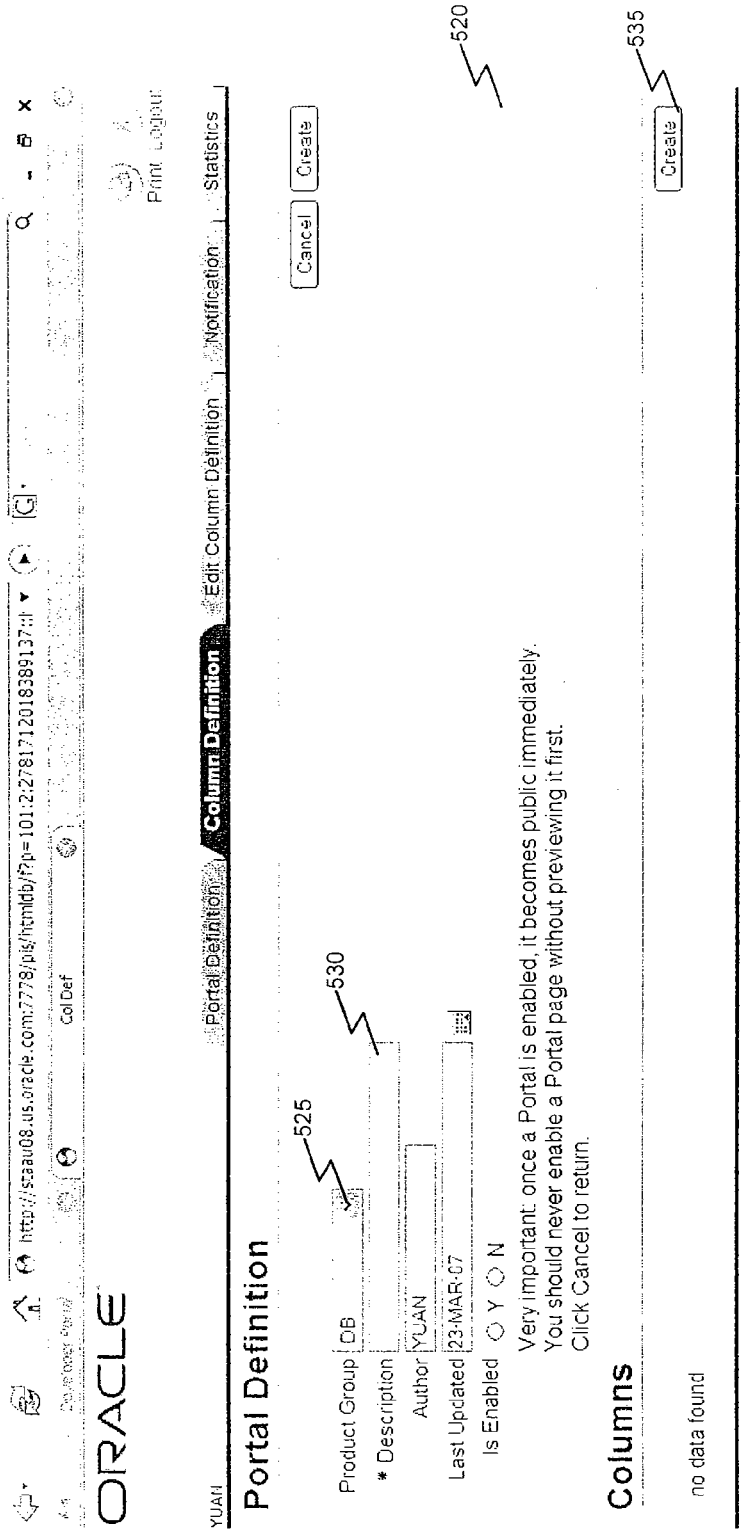

FIG. 5B is a screenshot illustrating an exemplary interface for creating a new report. In this example, a page 520 is displayed that can include various elements such as textboxes, radio buttons, combo boxes, etc for defining various information related to the report. The page 520 in this example includes a group box 525 for selecting or defining a product group for the report and a description text box 530 in which the user can provide a textual description for the report. The page 520 also includes a create button 535 which may be pressed or selected to open a new page for creating report columns.

Figure 5C:
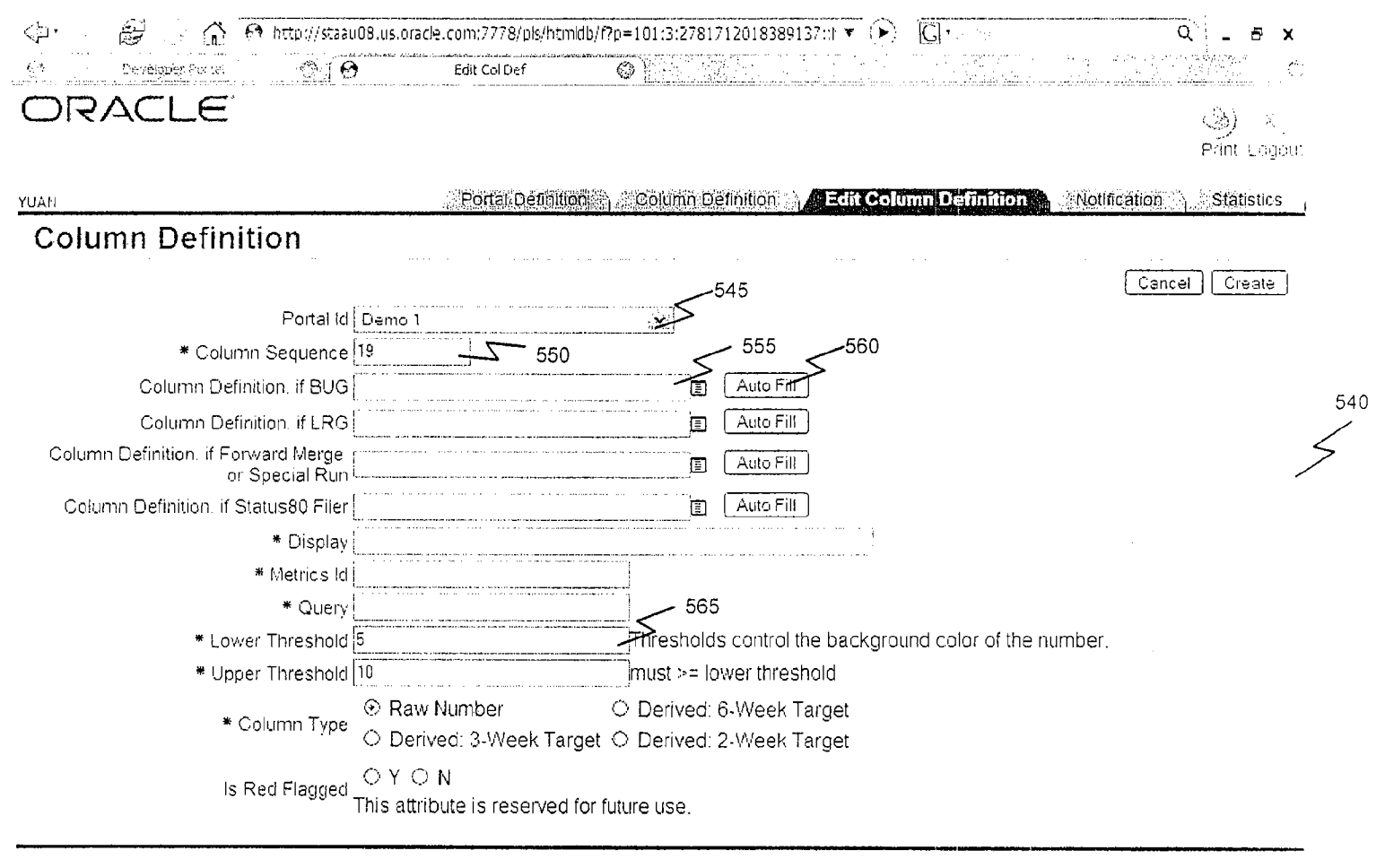

FIG. 5C is a screenshot illustrating a page 540 which may be presented in response to a user pressing or selecting the create button 535. In this example, the column definition page 540 includes a number of elements for defining the parameters, i.e., the metadata, for the report. For example, the page 540 includes a portal ID combo box for defining an identifier for the report, a sequence text box for defining a column sequence for the currently defined column in the report, a column definition textbox 55 in which a user can identify a query from the query repository to be represented in the column, and one or more threshold textboxes 565 in which threshold values for the column may be defined. Also, the page 540 in this example includes a number of auto fill buttons 560 associated with the column definition textboxes 555, which can be pressed or selected by the user to aid in the selection of a query from the query repository.

Figure 5D:
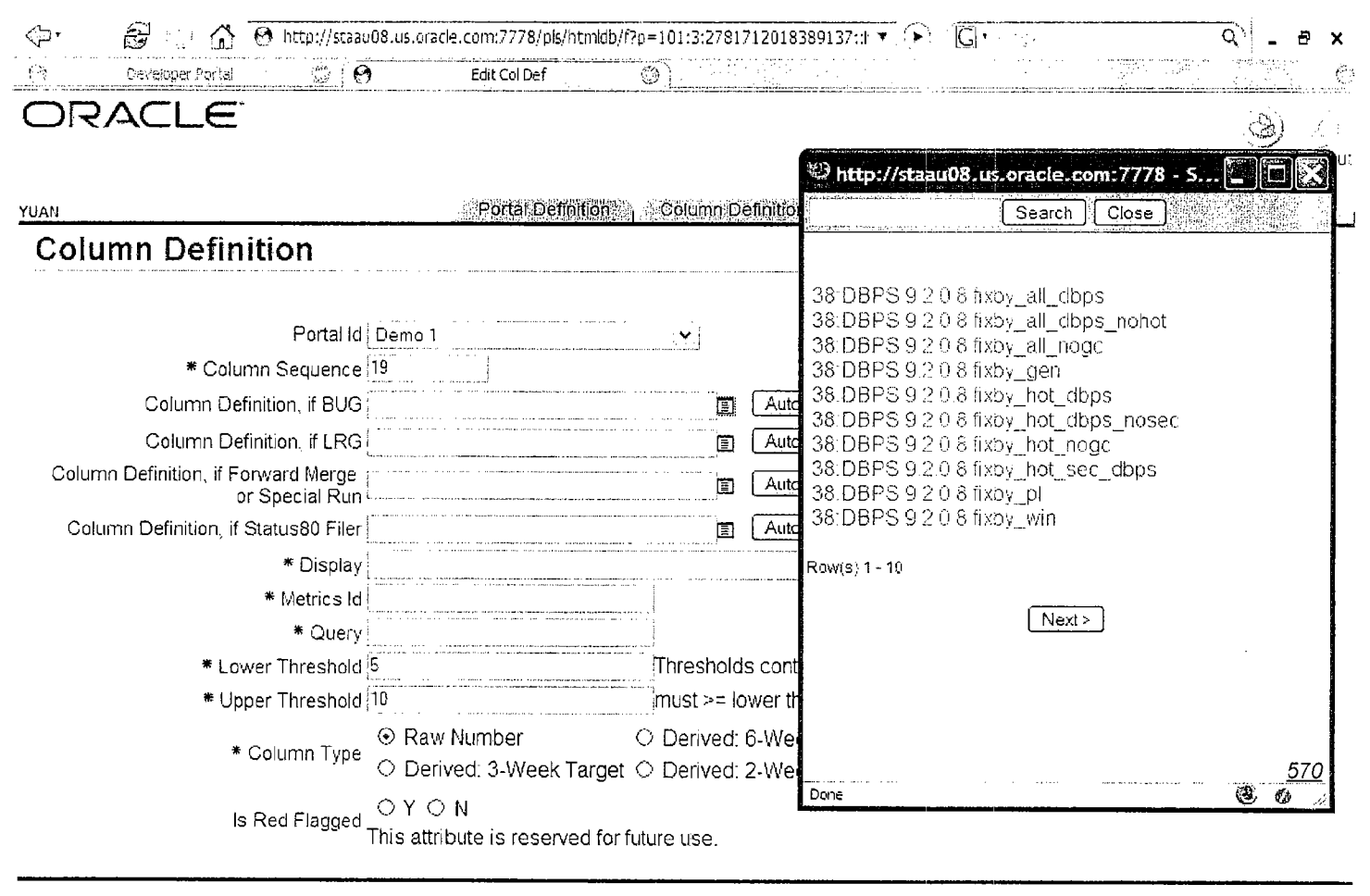

FIG. 5D is a screenshot illustrating a dialog box 570 which may be presented in response to a user pressing or selecting the auto fill button 535. In this example, the dialog box 570 includes a list of queries from which the user may select a query to be placed in the column definition textbox associated with the selected auto fill button.

Figure 6:
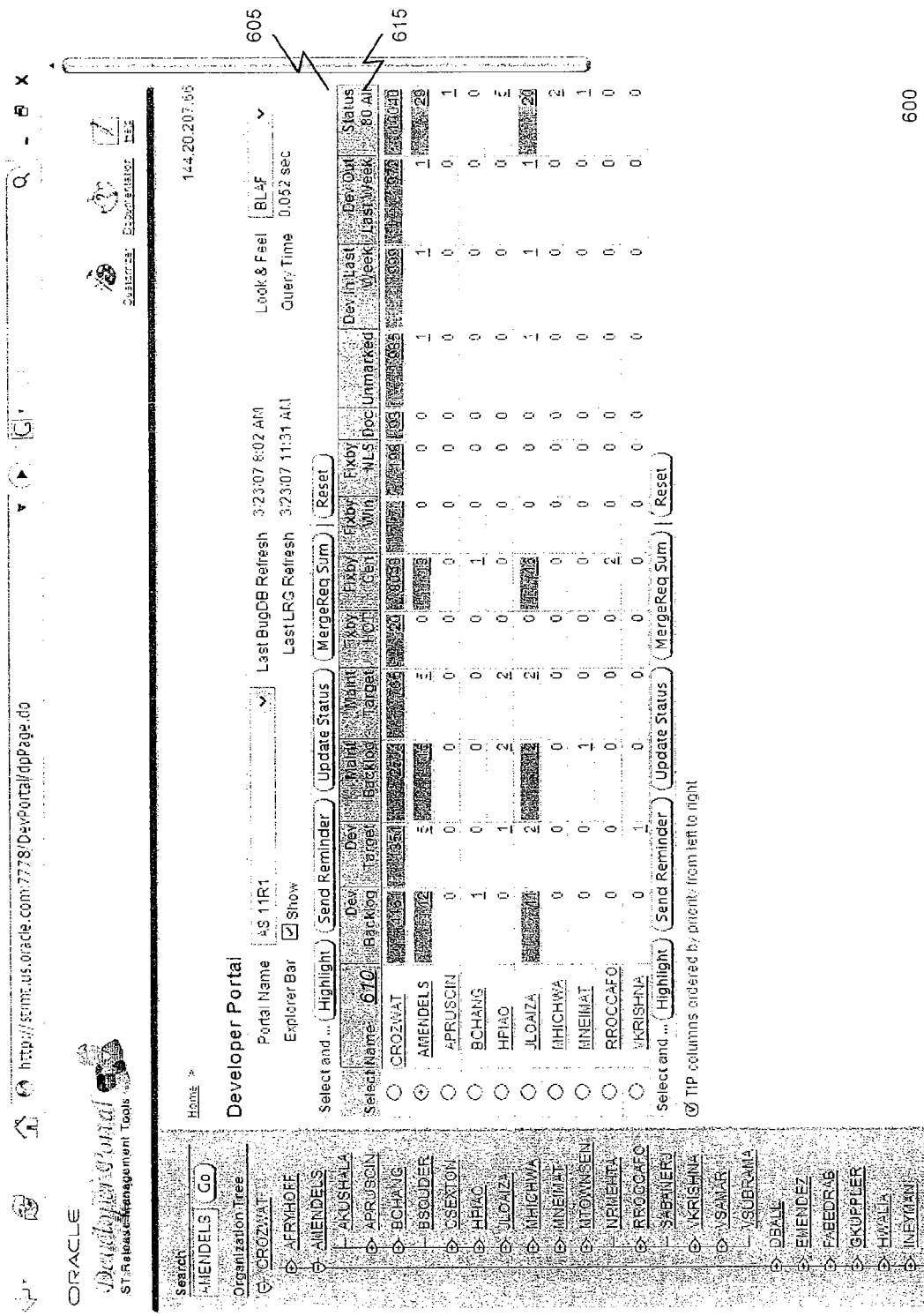
FIG. 6 is a screenshot illustrating an exemplary interface for outputting results of a dynamic report renderor according to one embodiment of the present invention.

FIG. 6 is a screenshot illustrating an exemplary interface for outputting results of a dynamic report renderor according to one embodiment of the present invention. More specifically, FIG. 6 illustrates a page 600 that can be displayed upon completion of queries associated with or defined for a selected report. The page 600 can include a table 605 including a name column 610 as well as other columns in which is displayed the column name 615 from the report metadata and presented in the order indicated by the column sequence indicated in the report metadata.

Figure 7:
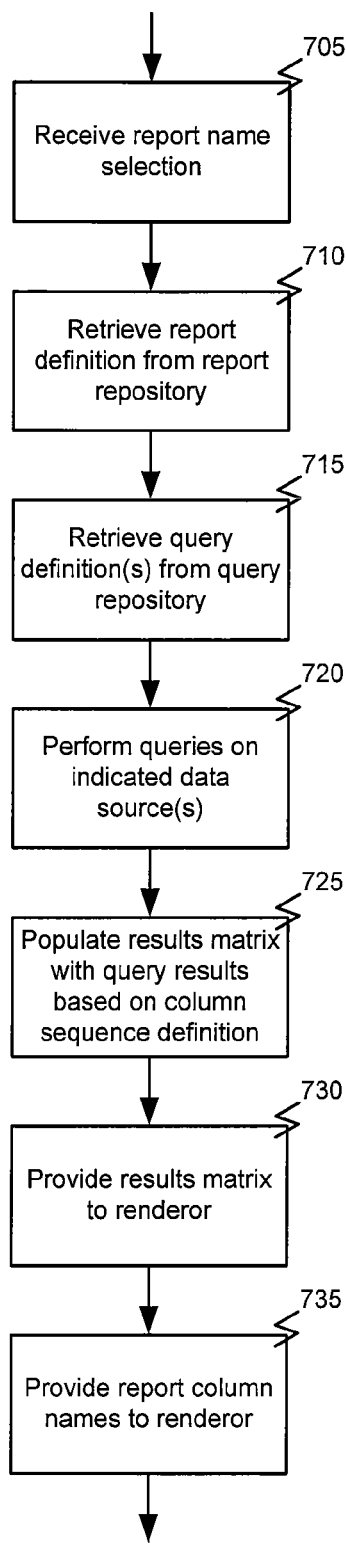
FIG. 7 is a flowchart illustrating a dynamic data provider process according to one embodiment of the present invention.

FIG. 7 is a flowchart illustrating a dynamic data provider process according to one embodiment of the present invention. In this example, dynamically reporting information stored in one or more data repositories can begin with receiving 705 a name of a report requested. That is, a user can request or select a name of a report defined via the report designed and for which metadata is stored in the report repository as described above. The report metadata for the requested report can be retrieved 710 from the report repository. As noted above, retrieving 710 the report metadata can comprise retrieving the report metadata from a plurality of report metadata in the report repository based on the name of the report requested and information within the report metadata identifying the report such as a "report name."

Also as noted above, the report metadata can define a format for the report and identify one or more queries for the report. Query metadata can be retrieved 715 from the query repository, for example based on the one or more queries identified in the report metadata and information within the query metadata identifying the query such as a "query name."

The query metadata can define one or more queries, for example in terms of Structured Query Language (SQL) queries. The one or more queries defined by the query metadata can be performed 720 on the one or more data repositories and a results matrix can be populated 725 with results of performing 720 the one or more queries defined in the query metadata. As noted above, the report metadata can comprise a column sequence definition. In such cases, populating 720 the results matrix with the results of performing the one or more queries can be based on the column sequence definition as well as other information that may be included in the report metadata for defining the report.

Once the results matrix has been populated 725, the matrix can be output or provided 730 to a renderor. Report column names and possibly other information from the report metadata may also be output 735 to the renderor.

Figure 8:
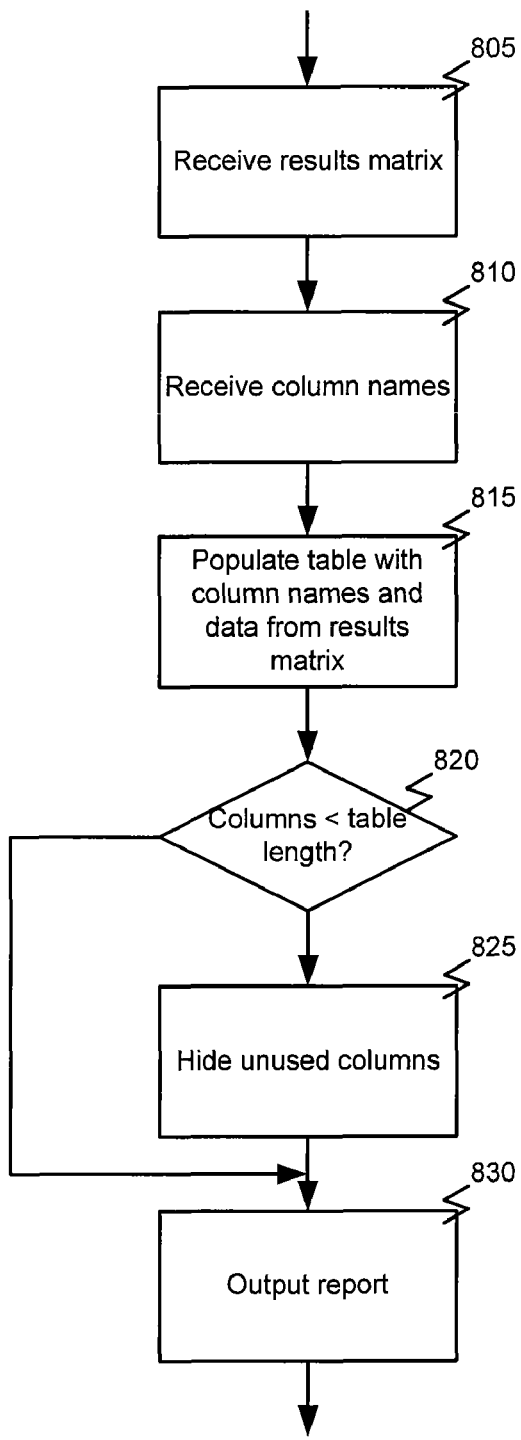
FIG. 8 is a flowchart illustrating dynamic report renderor process according to one embodiment of the present invention.

FIG. 8 is a flowchart illustrating dynamic report renderor process according to one embodiment of the present invention. In this example, processing begins with receiving 805 the results matrix. Column names and possibly other information from the report metadata for defining the report can also be received 810.

A table can be populated 815 with column names defined by the report metadata and the results of performing the one or more queries from the results matrix. A determination 820 can be made as to whether the results of performing the one or more queries comprises less than a predetermined size of the table. In response to determining 820 the results of performing the one or more queries comprise less than the predetermined size of the table, unused columns of the table can be hidden 825. The table can then be output 830 to present the report.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of dynamically reporting information stored in one or more data repositories, the method comprising:
    receiving a request for a pre-defined report, the request identifying a name of the report requested;
    retrieving report metadata from a report repository based on the name of the requested report, the report metadata identifying the name of the report, defining a format for the report including a column name for each of a plurality of columns in the report, identifying a query name for each of a plurality of pre-defined queries for the report, and defining a column sequence for each of the plurality columns in the report indicating an order for results of each of the plurality of queries;
    retrieving query metadata from a query repository, the query metadata defining each of the plurality of queries, wherein retrieving the query metadata from the query repository is based on the query names identified in the report metadata;
    performing each of the plurality of queries defined by the query metadata on the one or more data repositories; and
    populating a results matrix with results of performing each of the plurality of queries defined in the query metadata based on the column sequence for the plurality of columns defined in the report metadata.

2. The method of claim 1, wherein the one or more queries comprise Structured Query Language (SQL) queries.

3. The method of claim 1, further comprising:
    populating a plurality if columns in a table with the column names defined by the report metadata; and
    populating the plurality of columns of the table with the results of performing each of the plurality of queries from the results matrix.

4. The method of claim 3, further comprising determining whether the results of performing each of the plurality of queries comprises less than a predetermined size of the table.

5. The method of claim 4, further comprising, in response to determining the results of performing each of the plurality of queries comprises less than the predetermined size of the table, hiding unused columns of the table.

6. The method of claim 3, further comprising outputting the table.

7. A system comprising:
    a source data repository;
    a report repository having stored therein report metadata, the report metadata defining a format for one or more reports and identifying each of a plurality of queries for each of the one or more reports;
    a query repository having stored therein query metadata, the query metadata defining each of the plurality of queries; and
    a dynamic data provider module communicatively coupled with the source data repository, the report repository, and the query repository, wherein the dynamic data provider receives a request for a pre-defined report, the request identifying a name of the report requested, retrieves report metadata for a requested report from the report repository based on the name of the requested report, retrieves query metadata from the query repository, wherein the report metadata comprises a query name for each of the plurality of queries, an identification of the name of the report, a column name for each of a plurality of columns in the report, and a column sequence for each of the plurality of columns in the report indicating an order for results of each of the plurality of queries, and wherein retrieving the query metadata from the query repository is based on the query names, performs each of the plurality of queries defined by the query metadata on the source data repository, and populates a results matrix with results of performing each of the plurality of queries defined in the query metadata based on the column sequence for the plurality of columns defined in the report metadata.

8. The system of claim 7, wherein the one or more queries comprise Structured Query Language (SQL) queries.

9. The system of claim 7, further comprising a dynamic report renderor and wherein the dynamic data provider provides the results matrix and the column names defined by the report metadata to a dynamic report renderor.

10. The system of claim 9, wherein the dynamic report renderor receives the results matrix and the column names defined by the report metadata from the dynamic data provider, populates a plurality of columns in a table with the column names defined by the report metadata, and populates the plurality of columns of the table with the results of performing the one or more queries from the results matrix.

11. The system of claim 10, wherein the dynamic report renderor determines whether the results of performing each of the plurality of queries comprises less than a predetermined size of the table.

12. The system of claim 11, wherein the dynamic report renderor hides unused columns of the table in response to determining the results of performing each of the plurality of queries comprises less than the predetermined size of the table.

13. The system of claim 10, wherein the dynamic report renderor outputs the table.

14. The system of claim 7, further comprising a report designer tool communicatively coupled with the report repository and providing a user interface and utilities for generating and maintaining report metadata stored in the report repository.

15. The system of claim 7, further comprising a query repository builder tool communicatively coupled with the query repository and providing a user interface and utilities for generating and maintaining query metadata stored in the query repository.

16. A machine-readable medium having stored thereon a series of instructions which, when executed by a processor, cause the processor to report information stored in one or more data repositories by:
  receiving a request for a pre-defined report, the request identifying a name of the report requested;
  retrieving report metadata from a report repository based on the name of the requested report, the report metadata identifying the name of the report, defining a format for the report including a column name for each of a plurality of columns in the report, identifying a query name for each of a plurality of pre-defined queries for the report, and defining a column sequence for each of the plurality columns in the report indicating an order for results of each of the plurality of queries;
  retrieving query metadata from a query repository, the query metadata defining each of the plurality of queries, wherein retrieving the query metadata from the query repository is based on the query names identified in the report metadata;
  performing each of the plurality of queries defined by the query metadata on the one or more data repositories; and
  populating a results matrix with results of performing each of the plurality of queries defined in the query metadata based on the column sequence for the plurality of columns defined in the report metadata.

17. The machine-readable medium of claim 16, further comprising:
  populating a plurality if columns in a table with the column names defined by the report metadata; and
  populating the plurality of columns of the table with the results of performing each of the plurality of queries from the results matrix.

18. The machine-readable medium of claim 17, further comprising outputting the table.

* * * * *

UNITED STATES PATENT AND TRADEMARK OFFICE
CERTIFICATE OF CORRECTION

| | | |
|---|---|---|
| PATENT NO. | : 8,140,471 B2 | Page 1 of 1 |
| APPLICATION NO. | : 11/748613 | |
| DATED | : March 20, 2012 | |
| INVENTOR(S) | : Jiang et al. | |

It is certified that error appears in the above-identified patent and that said Letters Patent is hereby corrected as shown below:

In column 5, line 29, delete "may can" and insert -- may --, therefor.

In column 8, line 1, delete "extensible" and insert -- eXtensible --, therefor.

In column 8, line 20, delete "module335" and insert -- module 335 --, therefor.

In column 9, line 58, delete "can may" and insert -- may --, therefor.

In column 10, line 26, delete "can may" and insert -- may --, therefor.

Signed and Sealed this
Fifth Day of June, 2012

David J. Kappos
*Director of the United States Patent and Trademark Office*